United States Patent [19]
Mamyshev et al.

[11] Patent Number: 5,956,131
[45] Date of Patent: Sep. 21, 1999

[54] SYSTEM AND METHOD FOR MAPPING CHROMATIC DISPERSION IN OPTICAL FIBERS

[75] Inventors: Pavel V. Mamyshev, Middletown; Linn Frederick Mollenauer, Colts Neck, both of N.J.

[73] Assignee: Lucent Technologies Inc., Murray Hill, N.J.

[21] Appl. No.: 08/682,229

[22] Filed: Jul. 17, 1996

[51] Int. Cl.$^6$ .................................................. G01N 21/00
[52] U.S. Cl. .................. 356/73.1; 250/551; 250/227.18; 250/227.23
[58] Field of Search ........................... 356/73.1; 250/551, 250/227.18, 227.23

[56] References Cited

U.S. PATENT DOCUMENTS 4,984,884  1/1991  Ryu et al. ............................... 356/73.1
4,994,675  2/1991  Levin et al. ............................ 356/73.1

OTHER PUBLICATIONS

K. Inoue, "Four–Wave Mixing in an Optical Fiber in the Zero–Dispersion Wavelength Region", *J. Lightwave Technol.*, vol. 10, pp. 1553–1561 (1992).

*Primary Examiner*—Frank G. Font
*Assistant Examiner*—Reginald A. Ratliff
*Attorney, Agent, or Firm*—Steven R. Bartholomew; Brian K. Dinicola

[57] ABSTRACT

A system and method in which the chromatic dispersion characteristic, as a function of distance along a section of transmissive fiber, is measured. First and second optical signals are launched into a fiber under test to thereby generate, by a four-wave mixing process in the fiber, a probe signal. Because of a wave-vector phase mismatch, the probe signal power oscillates with a spatial frequency that can be measured as a function of distance in the fiber. The intensity oscillations are measurable as, for example, temporal variations in the Rayleigh backscattered light detected at the input end of the fiber. According to the present invention, the dispersion parameter at one or both of the first and second optical signal wavelengths, as a function of length along the fiber, is derived directly from these intensity oscillation measurements. From this information, it is possible to further derive maps at other wavelengths of interest.

18 Claims, 3 Drawing Sheets

SYSTEM AND METHOD FOR MAPPING CHROMATIC DISPERSION IN OPTICAL FIBERS

FIELD OF THE INVENTION

The present invention relates generally to optical fiber communications and, more particularly, to systems and methods for measuring and managing chromatic dispersion in optical fibers.

BACKGROUND OF THE INVENTION

Fiber chromatic dispersion has played an important role in the design of optical fiber systems for more than a decade. Until the advent of the erbium-doped fiber amplifier, the systems were more or less linear. Hence, it was only the integrated dispersion over a fiber span that influenced system performance. As the need to satisfy the demand for transmission capacity over greater distances has led to more sophisticated processing of optical signals, dispersion management—in which a dispersion "map" is chosen to minimize and/or harness the effects of fiber nonlinearities, has becoming an increasingly important tool.

In dispersion-shifted fiber (DSF), dispersion is known to vary as a function of location in the fiber. In a paper by K. Inoue entitled "Four-Wave Mixing in an Optical Fiber in the Zero-Dispersion Wavelength Region", J. Lightwave Technol., Vol. 10, pp. 1553–1561 (1992), for example, it was reported that when a 10-km section of DSF was cut into four 2.5-km segments, the average dispersion zero wavelength for the segments for the segments varied by at least 1 nm—a significant deviation for some applications. Accordingly, a reliable map of chromatic dispersion can not be obtained merely by measuring the average dispersion in the fiber span.

It has therefore been proposed to map the distribution of chromatic dispersion along a fiber span using a Rayleigh backscattering technique. This destructive technique, which relies on the dependence of the dispersion zero on the fiber core size, is described in an article by M. Ohashi and M. Tateda entitled "Novel Technique for Measuring the Distributed Zero-Dispersion Wavelength of Optical Fibers", Electron Letters., 29, 426–428 (1993). If the doping of the fiber preform does not change over its length, then changes in the dispersion zero can be inferred from changes in the core size. Changes in core size are estimated using optical time domain reflectometry (OTDR) to determine the capture ratio for Rayleigh backscattered light. By summing OTDR measurements taken in opposite directions, the effects of fiber loss are removed and changes in the capture ratio are observed and used to determine variations in the fiber dispersion zero.

Recently, a non-destructive dispersion measurement method was described that determined the local dispersion zero from modulation-instability-induced gain at wavelengths longer than the dispersion zero. A strong pump pulse of wavelength $\lambda_p$ and a weak signal pulse of wavelength $\lambda_s$ are injected simultaneously into a test fiber with the difference between $\lambda_p$ and $\lambda_s$ being about 5 to 10 nm. The backscattered signal light is observed through OTDR. When the pump wavelength is near the dispersion zero, but in the anomalous dispersion region, the modulation instability will provide gain for the probe pulse—gain that can be observed in the OTDR trace. Thus, reduction in the slope of the OTDR at a particular distance into the fiber indicates that the pump is experiencing anomalous dispersion at that point in the fiber. To map fiber dispersion, the pump and probe wavelength are swept, maintaining a constant separation, $\lambda_p-\lambda_s$, and the resulting OTDR traces are recorded. The dispersion zero of a particular point in the fiber is at the short-wavelength side of those pump wavelengths for which modulation-instability gain is observed. This technique has demonstrated a wavelength resolution of 0.2 nm and a spatial resolution of about a kilometer.

Yet another technique that has been proposed uses partially-degenerate four-photon mixing to determine the dispersion zero. Essentially, the mixing generates an idler wave from pump and signal waves of angular frequencies $\omega_p$ and $\omega_s$ propagating in the fiber. The power of the idler wave with frequency $\omega_i=2\omega_p-\omega_s$, will be maximized when the process is phase matched, that is, when $\Delta\beta=2\beta(\omega_p)-\beta(\omega_s)-\beta(\omega_i)=0$, where $\beta(\omega)$ is the propagation constant. To first approximation, phase matching occurs when $\omega_p$ is set to the dispersion zero of the fiber. Thus, by tuning $\omega_p$, and looking for a maximum in idler power, it is possible to measure the zero-dispersion wavelength. Distance resolution is obtained by using signal and pump pulses with widely-separated wavelengths. Specifically, the differing group velocities of the pump and signal pulses cause the pump to overtake the signal pulse (assuming the pump wavelength is near the dispersion zero of the fiber). With sufficient group-velocity dispersion and short enough pulses, the region of overlap of the pulses occurs over some useful distance. The timing of the pulses at $\omega_p$ and $\omega_s$ can then be adjusted so that this overlap occurs at some desired point within the fiber.

Each of the above-described techniques permits measurement of the wavelength of zero dispersion. Disadvantageously, such techniques require extensive data-gathering over a considerable wavelength range, so that the measurements for just one dispersion map take a long time. Moreover, access is required to both ends of the fiber under investigation.

SUMMARY OF THE INVENTION

The aforementioned deficiencies are addressed, and an advance is made in the art, by a system and method in which the chromatic dispersion parameter, as a function of distance along a section of transmissive fiber, is measured. In accordance with an illustrative embodiment of the invention first and second optical pulses are repetitively launched into a fiber under test to thereby generate, by a four-wave mixing process in the fiber, a probe signal. Because of the wave-vector phase mismatch, the probe signal power oscillates with a spatial frequency that can be measured as a function of distance in the fiber. These intensity oscillations are measurable as, for example, as temporal variations in the Rayleigh backscattered light detected at the input end of the fiber. According to the present invention, the dispersion parameter at one or both of the first and second optical signal wavelengths, as a function of length along the fiber, is derived directly from these intensity oscillation measurements. From this information, it is possible to further derive maps at other wavelengths of interest.

BRIEF DESCRIPTION OF THE DRAWINGS

Various advantages of the present invention will become apparent to one skilled in the art upon by reference to the specification which follows and to drawings, in which.

DETAILED DESCRIPTION OF THE INVENTION

According to the present invention, strong, sub-microsecond pulses at fixed wavelengths $\lambda_1$ and $\lambda_2$, respectively, are simultaneously launched into a length of fiber under test, so that they may generate respective FWM product fields at the Stokes wavelength $\lambda_S$ and the anti-Stokes wavelength $X_A$, sequentially in each part of the fiber. By measuring the frequency of the intensity oscillations in the probe signals generated in this manner, a detailed dispersion map, $D(\lambda_i, z)$ can be obtained directly, where D is the dispersion parameter, $\lambda_i$ is the wavelength of one of the two aforementioned fixed-wavelength sources used and z is the distance to a particular point along the fiber. Before proceeding to a description to an illustrative system which may be utilized to acquire a detailed dispersion map in accordance with the present invention, the fundamental principles involved will first be discussed briefly.

CHROMATIC DISPERSION

The dispersion relation for an optical fiber is given by:

$$k(\omega) = k_0 + \left.\frac{\delta k}{\delta \omega}\right|_0 (\omega - \omega_0) + 1/2 \left.\frac{\delta^2 k}{\delta \omega^2}\right|_0 (\omega - \omega_0)^2 + \ldots \quad (1)$$

where $k_0$ and all derivatives are evaluated at the (arbitrary) frequency $\omega_0$. The first derivative of the dispersion relation with respect to $\omega$ is the inverse group velocity, and its second derivative is the corresponding dispersion. The dispersion parameter, D, is the wavelength derivative of the inverse group velocity:

$$D(\lambda) \equiv \frac{\delta}{\delta \lambda} \delta \frac{k}{\delta \omega} = -\frac{2\pi c}{\gamma^2} \frac{\delta^2 k}{\delta \omega^2} (\omega \to \lambda) \quad (2)$$

FOUR-WAVE MIXING PROCESSES

Figure 1:
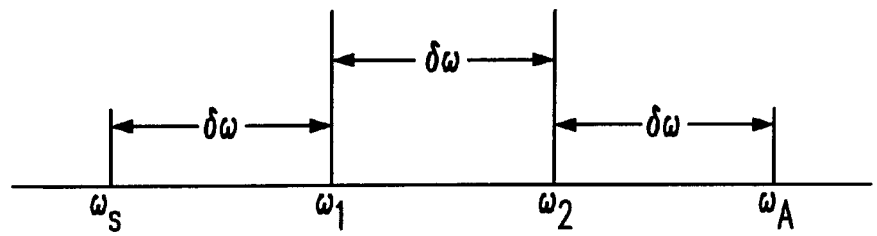
FIG. 1 is a graph showing the spectrum of the four-wave mixing process employed by the present invention.

Essentially, the present invention is based upon the realization by the inventors herein that the dispersion parameter $D(\lambda_i)$ is directly proportional to the wave-vector mismatch for one of two four-wave mixing processes depicted in FIG. 1. In a first of these processes, two photons at angular frequency $\omega_1$ combine with one at angular frequency $\omega_2$ to form a Stokes photon at $\omega_S$. Symmetrically, in a second mixing process two photons at angular frequency $\omega_2$ combine with one at angular frequency $\omega_1$ to form an anti-Stokes photon at $\omega_A$. Thus, for energy conservation, all spectral terms in FIG. 1 are separated uniformly by an amount $\delta\omega$.

For a detailed discussion of the well known physics of four-wave mixing, reference may be had to a paper by the inventors herein entitled "Pseudo-phase-matched four-wave mixing in soliton WDM transmission", Opt. Lett. 21, 396 (1996).

WAVE-VECTOR MISMATCH

It can then be shown that the wave-vector mismatch, $\delta k$, for the aforementioned first and second mixing process is in direct proportion to dispersion parameters $D(\lambda_1)$ and $D(\lambda_2)$, respectively. In the case of the first mixing process, for example, the wave-vector mismatch can be related to the dispersion parameter $D(\lambda_1)$ as follows:

$$\delta k(\lambda_1) = k_2 + k_s - 2k_1 = \left.\frac{\partial^2 k}{\partial \omega^2}\right|_{\overline{\omega}_1} \delta\omega^2 = -2\pi c D(\lambda_1) \left(\frac{\delta\lambda}{\lambda}\right)^2 \quad (3)$$

The final form of Eq. (3) is accurate because in accordance with the inventive method, the condition $\delta\omega/\omega = -\delta\lambda/\lambda \ll 1$ is always satisfied. It should also be noted that the net term in Eq. (3) contributed by third order dispersion $\partial^3 k/\partial\omega^3$ $\partial D/\partial \lambda$ is identically zero. The effects of still higher orders of dispersion, while not always identically zero, nevertheless tend to be negligible because of the small sizes of the derivatives and of the interval $\delta\lambda$.

CALCULATION OF THE SIGNAL POWER

As indicated above, the inventive technique of the present invention involves launching two optical signals to thereby generate respective FWM product fields at the Stokes wavelength $\lambda_S$ and the anti-Stokes wavelength $\lambda_A$ sequentially in each part of the fiber. Because of the aforementioned phase mismatch ($\delta k$), the corresponding power of the Stokes signal $P_S(z)$ oscillates with the spatial frequency $$F_s = 1/\Lambda_s = \frac{\delta k}{2\pi} = cD(\lambda_1)\left(\frac{\delta\lambda}{\lambda}\right)^2 \quad (4)$$

Accordingly, by measuring the frequency $F_S(z)$ of the intensity oscillations in the power of the Stokes signal, it is possible to obtain a dispersion map $D(\lambda_1, z)$ having a spatial resolution $\Lambda_S$. Of course, it will be readily appreciated by those skilled in the art that it is equally possible to obtain a dispersion map $D(\lambda_2, z)$ by measuring the frequency $F_A(z)$ of intensity oscillations in the power of the anti-Stokes signal. As such, an accurate dispersion map for one or both of the signals launched into the fiber under test can thus be readily obtained by applying the teachings of the present invention. Moreover, from knowledge of the third order dispersion constant—which can be quickly determined by comparing measurements of dispersion maps $D(\lambda_1, z)$ and $D(\lambda_2, z)$—either of the measured dispersion maps can be easily converted to that for any other desired wavelengths.

A variety of techniques may be utilized to measure the aforementioned intensity oscillations. By way of illustrative example, they may be observed in Rayleigh backscattering at the input end of the fiber under test. There, the signal will fluctuate at a temporal frequency $$f_{sig}(t) = \frac{c}{2n} F_s(z) \quad (5)$$

where n is the effective index of refraction of the fiber, and where t is the round-trip time from the fiber input to point z and return, i.e., $$t = \frac{2nz}{c} \quad (6)$$

For a typical index of 1.46, $\delta t$ is 9.73 $\mu s$ for each kilometer of fiber. Combining Eqs. (4) and (5), the dispersion map is obtained for the first input signal at wavelength $\lambda_1$ $$D(\lambda_1, z) = \frac{2n}{c^2}\left(\frac{\lambda_1}{\delta\lambda}\right)^2 f_{sig}\left(t = \frac{2n}{c}z\right) \quad (7)$$

As will be discussed in detail later, the frequencies dictated by Eq. 7 are typically in a range of some tens to a few hundreds of kilohertz.

From the known loss and scattering properties of the fiber, and an understanding of the physics of the aforementioned four-wave mixing process, the strength of the Rayleigh backscattered signal can be estimated. For the case where the input pulses at $\lambda_1$ and $\lambda_2$ are co-polarized, and where there is no significant initial signal at $\lambda_S$ and $\lambda_A$, the signal power at the Stokes wavelength $\lambda_S$ is $$P_S(z) = 8\left(\frac{\lambda}{Dc\delta\lambda^2}\right)^2\left(\frac{n_2 P_1^0}{A_{eff}}\right)^2 P_2^0 \sin^2(\delta k z/2) \times R\delta z \times \exp(-4\alpha z) \quad (8)$$

As will be immediately apparent to those skilled in that art, a similar expression yields the signal power $P_A(z)$, at the anti-Stokes wavelength $\lambda_A$. In Eq. (8), $P_1^0$ and $P_2^0$ are the pulse powers at the fiber input, $A_{eff}$ is the effective area of the fiber core, $n_2$ is the non-linear index coefficient ($n_2$ is $2.7 \times 10^{-8}$ $\mu m^2/W$ for silica glass fibers), R is the Rayleigh back-scattering coefficient, $\delta z$ is the fiber length occupied by the pulses at any given time, and $\alpha$ is the fiber's loss coefficient. The factor of four in the exponential loss term stems from the facts that (1) the product $P_1^2 P_2$ declines as $\exp(-3\alpha z)$, and (2) the Rayleigh backscattering at a given point z along the fiber suffers an additional loss factor of $\exp(-\alpha z)$ in returning to the fiber input. From Eq. (8), it can be seen that for pulse input powers ($P_1^0$ and $P_2^0$) on the order of 1 W, there should be adequate signal strength for measurements of fiber spans up to several tens of kilometers long.

Figure 2:
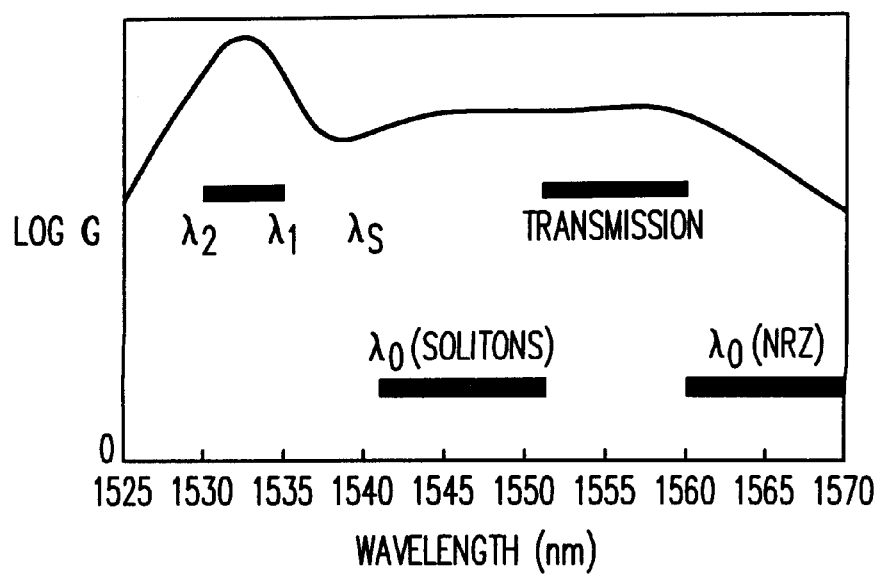
FIG. 2 is a graph depicting the most probable band for transmission, and most suitable wavelengths for measurement of dispersion parameter maps, in relation to the gain profile of an erbium fiber amplifier.

With particular reference now to FIG. 2, it will be appreciated that the band of wavelengths currently of greatest interest for long distance transmission corresponds to the broad, relatively flat gain peak of erbium fiber amplifiers lying roughly between 1552 and 1560 nm. For soliton transmission using "dispersion tapered" fiber spans, the wavelength of zero dispersion, $\lambda_0$, will correspondingly lie in the range between ~1542 and 1553 nm, and for "non-return-to-zero systems" (NRZ), $\lambda_0$ will lie at even longer wavelengths. For several reasons, it is preferred, though not required, that the input or measuring wavelengths $\lambda_1$ and $\lambda_2$ be to the short wavelength side of the shortest anticipated value for $\lambda_0$. This relationship will, for example, ensure that there is no "modulational instability", regardless of the respective power levels. At power levels approaching 1 W, this would certainly not be the case if $\lambda_1$ and $\lambda_2$ were greater than $\lambda_0$. Moreover, since the signals do not depend on the sign of the dispersion parameter D, the dispersion map tends to be ambiguous unless it is always well to one side of D=0. Finally, the spatial resolution tends to become poor as $D(\lambda_1)$ approaches zero. The inventors herein have observed that excellent results are obtained, for example, when $\lambda_1$ and $\lambda_2$ are chosen to lie in the vicinity of the 1530 nm gain peak of an erbium doped amplifier, as shown in FIG. 2. Of course, if the wavelength band of interest is not to the short wavelength side of the shortest anticipated value for $\lambda_0$, as it would not be in the popular case where the band of $\lambda_0$ is centered about, say 1515 nm, then the input power levels of the measuring wavelength signals should be reduced below the threshold for modulational instability, that is, below about 200 mw. Alternatively, an amplifier with a different characteristic gain curve might be employed.

It should be noted that there is a non-linear contribution to the wave-vector mismatch $\delta k$, which for the first (Stokes) mixing process is given by the relation $$\delta k_{nl} = \gamma(2P_1 - P_2) \quad (9)$$

with a similar expression (just reverse the subscripts 1 and 2) for the second (anti-Stokes) mixing process. In Eq. (9), $\gamma$ is given by the relation $$\gamma = \frac{2\pi}{\lambda}\frac{n_2}{A_{eff}} \quad (10)$$

For the first mixing process, $\delta k_{nl}$ is zero if $P_2 = 2P_1$. Identically, of course, $\delta k_{nl}$ is zero if $P_1 = 2P_2$ for the second mixing process. Even if the appropriate one of those conditions is not precisely met, however, note that $\delta k_{nl}$ will tend to be only a small fraction of the linear $\delta k$ for all dispersion parameters D but those very close to zero, since $\gamma$ is numerically very small—about 2.5 $W^{-1} km^{-1}$ where $A_{eff} = 50$ $\mu m^2$ and $\lambda$ is approximately 1530 nm, for example.

Figure 3:
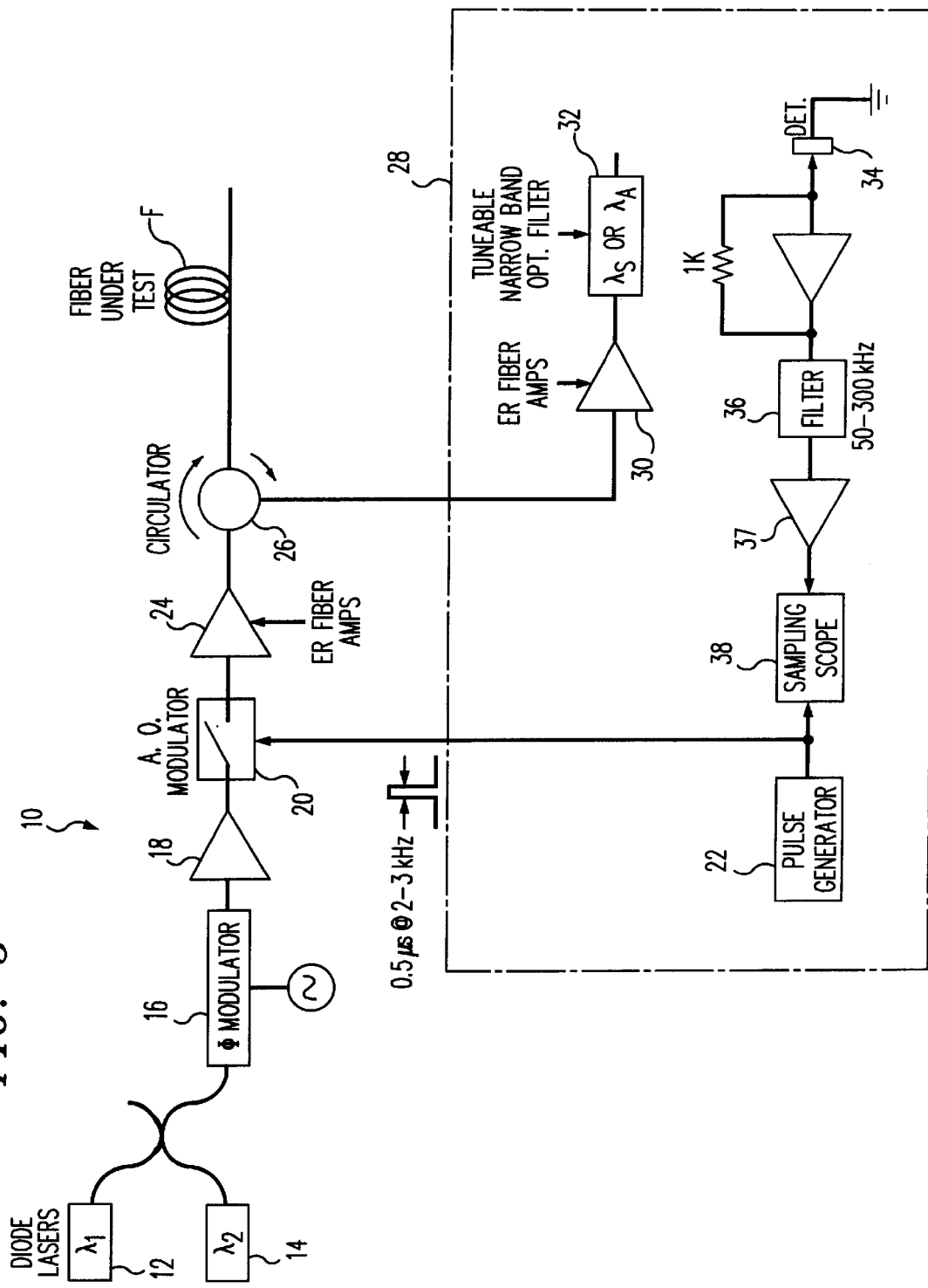
FIG. 3 is a block diagram showing a chromatic dispersion characteristic measuring system according to an illustrative embodiment of the present invention.

With reference now to FIG. 3, there is shown a dispersion map measuring system 10 constructed in accordance with an illustrative embodiment of the present invention. The fixed input signals $\lambda_1$ and $\lambda_2$ are generated by first and second cw sources 12 and 14, respectively. In the illustrative embodiment, the sources 12 and 14 are configured as diode lasers tuned to provide pulses at 1532.6 nm and 1536.15 nm, respectively (for a wavelength separation of 3.55 nm). It will, of course, be readily appreciated by those skilled in the art that the wavelengths provided are for exemplary purposes only, and, moreover, they may be generated by any suitable optical signal generating device, including an optical pulse generation. Because orthogonal polarizations have the potential to reduce the signal intensity by up to a factor of ten or more, care should be taken to see that the cw sources 12 and 14 are co-polarized to provide an adequate signal intensity.

The cw signals output by optical sources 12 and 14 are combined and input to a phase modulator 16. While not required, the phase modulator advantageously serves to remove the annoying high-frequency (~1 MHz) modulation from the input signals that results from the finite temporal width of the exciting pulses. The output of the phase modulator is amplified by amplifier 18, and an accousto-optic modulator 20 coupled to a pulse generator 22 shapes the output of the cw sources into pulses at $\lambda_1$ and $\lambda_2$. The output of the accousto-optic modulator 20 is supplied to an optical amplifier 24, an erbium doped fiber amplifier (EDFA) in the illustrative example, which amplifier provides sufficient gain to bring the pulse signals up to peak power levels near 1 W. Even though the pulse powers at the output of amplifier 24 are on the order of 1 W, the low duty cycle and energy storage performance of the amplifier allow a pump power for the amplifier that is on the order of only a few tens of mw.

A three-port optical circulator 26 launches the pulses into the fiber under test, indicated generally at F, and directs the Rayleigh backscattered signal to a tunable receiver arrangement 28. In the illustrative apparatus depicted in FIG. 3, the receiver arrangement 28 comprises an EDFA pre-amplifier 30 which provides sufficient gain to allow subsequent processing of the backscattered signals. Tuning to the desired backscattered signal, which will at either the Stokes or anti-Stokes wavelength, is achieved by a tunable narrow band optical filter 32 which passes the signal of interest to a photodetector 34 for detection. Such an optical filter may be constructed, for example, by cascading a piezo-tuned Fabry-Perot etalon with a bandwidth of 20 Ghz and a free spectral range of 16 nm, with a tuneable, 1 nm bandwidth interference filter (neither of which are shown). The output of photodetector 34 is filtered by a bandpass filter 36, amplified by an amplifier 37, and supplied to a sampling oscilliscope 38.

Figure 4:
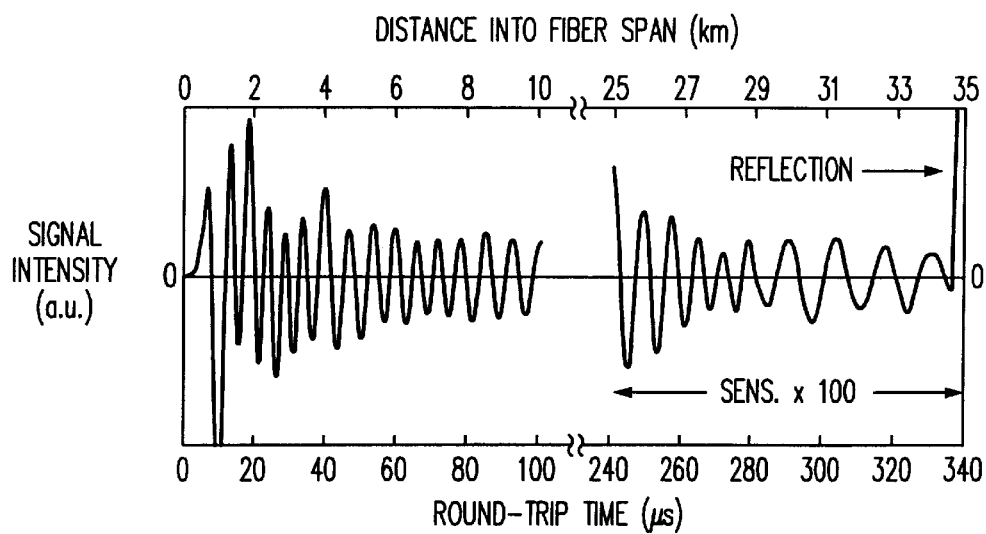
FIG. 4 is a graph depicting several samples of the signal returned from a "dispersion tapered" span of fiber.

FIG. 4 shows samples of the signal returned from a 34.4 km long, "dispersion tapered" span of fiber under test using the apparatus of FIG. 3. The samples were of the signal voltage waveform at $\lambda_S$=1539.70 nm, and as averaged over a few hundred repetitions with a required total averaging time of less than 0.2 seconds. The high-intensity input end is at 0 km. An excellent signal-to-noise ratio can be observed, even at the far end of the span. This is due, in part, to the narrow effective bandwidth used to compute the noise referred to the input of the EDFA pre-amplifier 30 (FIG. 3), which was about 70 Mhz taken from the geometric mean of the bandwidths, 20 Ghz and 250 kHz, respectively, of the two filters in the receiver chain. Similar results were obtained for the anti-Stokes signal waveform at $\lambda_A$=1529.05 nm.

Figure 5:
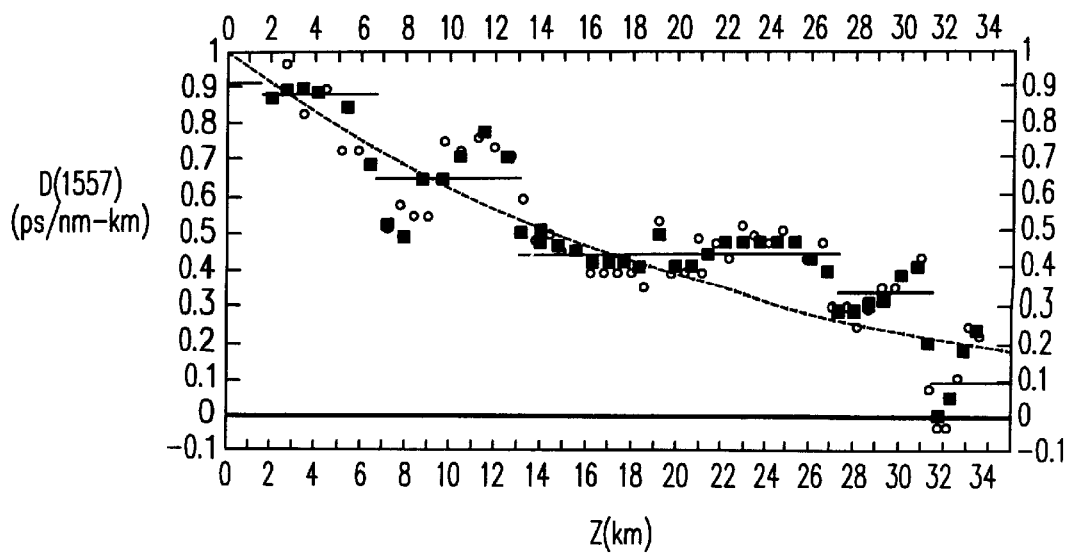
FIG. 5 is a graph comparing dispersion maps obtained utilizing the method of the present invention with those obtained by a conventional, destructive technique.

With reference now to FIG. 5, there are shown the nearly identical dispersion maps D(1557, z) of the same dispersion tapered span discussed above, as inferred from (1) the Stokes signal, (2) the ant-Stokes signals, and (3) as translated to the common wavelength of 1557 nm. The dashed curve corresponds to the ideal exponential taper. Similar results were also obtained using a conventional destructive technique during which the fiber was cut into five sections. The results obtained in accordance with the present invention compare favorably to the results of the destructive examination, the latter being shown by the solid horizontal lines in FIG. 5. For the translation, third order dispersion values were used, as determined from a comparison of the Stokes and anti-Stokes signals themselves. These third order dispersion values were not strictly constant across the span.

For the determination of the dispersion maps shown in FIG. 5, the pump intensities at $\lambda_1$ and $\lambda_2$ were adjusted to be in a two-to-one ratio, respectively, for the measurement at $\lambda_S$, and in a one-to-two ratio for the measurement at $\lambda_A$. According to Eq. (9), supra, no nonlinear contribution to the wave-vector mismatch should be discernible. This prediction was confirmed by noting a lack of any measurable change in the observed frequencies as the net pump power is reduced, so long as the two-to-one power ratios are maintained.

In view of the foregoing, it should be readily apparent to those skilled in the art that the inventive technique described herein makes it possible to obtain rapid and facile measurements of the dispersion maps of long fiber spans, with an accuracy of ±0.03 ps/nm-km or better throughout the span, and with a spatial resolution of a fraction of a kilometer. Although one specific embodiment of the present invention has been described, various changes and modifications may be made by those skilled in the art without departing from the spirit and scope of the present invention, as defined by the appended claims.

What is claimed is:

1. A method of mapping chromatic dispersion in a span of optical fiber, comprising the steps of:

launching into a first end of said fiber, simultaneously, a first optical signal at a first wavelength and a second optical signal at a second wavelength to thereby generate a probe signal via a four wave mixing process in which two photons at said first wavelength combine with one photon at said second wavelength;

measuring the frequency of oscillations of the probe signal as a function of distance in the fiber; and deriving, for at least one of the first and second wavelengths, a chromatic dispersion parameter as a function of distance along the fiber from the measurement obtained during the measuring step.

2. The method of claim 1, wherein said probe signal is a Stokes signal.

3. The method of claim 2, wherein the second wavelength is shorter than the first wavelength and the ratio of launched power between the first and second wavelengths is approximately 1:2.

4. The method of claim 1, wherein said probe signal is an anti-Stokes signal.

5. The method of claim 4, wherein the first wavelength is shorter than the first wavelength and the ratio of launched power between the first and second wavelengths is approximately 2:1.

6. The method of claim 1, wherein a chromatic dispersion parameter is derived for each of said first and second wavelengths and wherein said method further includes a step of calculating a third order dispersion parameter from differences between the two derived chromatic dispersion parameters.

7. The method of claim 1, wherein said measuring step is performed by observing a Rayleigh-backscattered sample of the probe signal at the first end of the fiber.

8. The method of claim 1, wherein said measuring step is performed by observing a plurality of side-scattered samples of the probe signal.

9. The method of claim 1, in which the first and second wavelengths are shorter than the shortest anticipated wavelength of zero dispersion in the span under test.

10. The method of claim 1, wherein said launching step comprises repetitively launching pulses at said first and second wavelengths.

11. An apparatus for measuring the chromatic dispersion characteristic in a span of optical fiber, comprising:

an optical signal generating arrangement for launching into a first end of said fiber, simultaneously, a first optical signal at a first wavelength and a second optical signal at a second wavelength to thereby generate a probe signal via a four wave mixing process in which two photons at said first wavelength combine with one photon at said second wavelength; and a detecting arrangement for measuring the frequency of oscillations of the probe signal as a function of distance in the fiber, whereby for at least one of the first and second wavelengths, a chromatic dispersion parameter can be derived as a function of distance along the fiber.

12. The apparatus of claim 11, wherein said probe signal is a Stokes signal.

13. The apparatus of claim 12, wherein the second wavelength is shorter than the first wavelength and the ratio of launched power between the first and second wavelengths is approximately 1:2.

14. The apparatus of claim 11, wherein said probe signal is an anti-Stokes signal.

15. The apparatus of claim 14, wherein the first wavelength is shorter than the first wavelength and the ratio of launched power between the first and second wavelengths is approximately 2:1.

16. The apparatus of claim 11, wherein said detecting arrangement is operable to receive a Rayleigh-backscattered sample of the probe signal at the first end of the fiber.

17. The apparatus of claim 11, in which the first and second wavelengths are shorter than the shortest anticipated wavelength of zero dispersion in the span under test.

18. The apparatus of claim 11, wherein the first and second optical signals are pulses.

* * * * *